(12) United States Patent
Mihara

(10) Patent No.: US 8,362,118 B2
(45) Date of Patent: Jan. 29, 2013

(54) RUBBER COMPOSITION FOR USE IN TIRES

(75) Inventor: Satoshi Mihara, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 128 days.

(21) Appl. No.: 12/961,345

(22) Filed: Dec. 6, 2010

(65) Prior Publication Data

US 2011/0144236 A1    Jun. 16, 2011

(30) Foreign Application Priority Data

Dec. 10, 2009  (JP) ................................ 2009-280831

(51) Int. Cl.
*B60C 1/00*  (2006.01)
*C08K 3/36*  (2006.01)

(52) U.S. Cl. ........... 524/77; 524/492; 524/493; 524/575

(58) Field of Classification Search ................ 524/77, 524/492, 493, 575
See application file for complete search history.

(56) References Cited

FOREIGN PATENT DOCUMENTS

| JP | 60605418 | 3/1994 |
|---|---|---|
| JP | 11246711 | 9/1999 |
| JP | 2004018760 | 1/2004 |
| JP | 2007-321093 | 12/2007 |
| JP | 2007321046 A * | 12/2007 |
| JP | 2008291147 | 12/2008 |
| JP | 2009051975 | 3/2009 |
| JP | 2009138157 | 6/2009 |

OTHER PUBLICATIONS

Machine translation of JP 2007-321046 A, Dec. 13, 2007.*

* cited by examiner

*Primary Examiner* — Vickey Nerangis
(74) *Attorney, Agent, or Firm* — Thorpe North & Western LLP

(57) ABSTRACT

A rubber composition for use in tires including from 60 to 120 parts by weight of a silica having a CTAB specific surface area of from 70 to 175 $m^2/g$ and from 3 to 25 parts by weight of an aromatic modified terpene resin excluding terpene phenol resins per 100 parts by weight of a diene rubber including from 30 to 80 weight % of a terminal-modified styrene-butadiene rubber and from 10 to 50 weight % of a butadiene rubber. An average glass transition temperature of the diene rubber is −55° C. or lower and an average glass transition temperature of a component formed from the diene rubber, the aromatic modified terpene resin, and an optional plasticizer is −45° C. or lower.

16 Claims, No Drawings

RUBBER COMPOSITION FOR USE IN TIRES

PRIORITY CLAIM

This application is based upon and claims the benefit of priority from Japanese Patent Application No. 2009-280831, filed Dec. 10, 2009, the entire contents of which is incorporated herein by reference.

BACKGROUND

1. Technical Field

The present technology relates to a rubber composition for use in tires, and more particularly relates to a rubber composition for use in tires having grip performance on both icy and snowy road surfaces and wet road surfaces enhanced to or above conventional levels.

2. Related Art

Pneumatic tires for use on icy and snowy roads (studless tires) are designed to enhance grip performance by increasing adhesion force to icy and snowy road surfaces by maintaining hardness of a tread rubber while still remaining pliable, even at low temperatures. Additionally, in recent years, there has been a demand for studless tires having enhanced traveling performance on wet road surfaces that are not covered with ice and/or snow as well as travelling performance on icy and snowy road surfaces as described above. Conventionally, a styrene butadiene rubber having a high glass transition temperature (Tg) has been compounded in order to enhance the wet grip performance. However, when a styrene butadiene rubber having a high Tg is compounded, the Tg of the entire rubber composition increases, which leads the adhesion force to icy and snowy road surfaces being negatively affected due to an increase in a rubber hardness at low temperatures.

To resolve this problem, Japanese Unexamined Patent Application Publication No. 2007-321093 proposes enhancing braking performance on wet road surfaces and on ice by compounding 100 parts by weight of a diene rubber including from 20 to 80 weight % of a natural rubber and/or an isoprene rubber and from 80 to 20 weight % of a butadiene rubber with a terpene resin having a glass transition temperature of −10° C. or lower. However, this rubber composition still has room for further improvement because it has not sufficiently satisfied the demands for higher levels of both travelling performance on icy and snowy road surfaces and travelling performance on wet road surfaces.

SUMMARY

In order to achieve the aforementioned object, the present technology provides a rubber composition for use in tires including from 60 to 120 parts by weight of a silica having a Cetyltrimethylammonium Bromide (CTAB) specific surface area of from 70 to 175 m²/g and from 3 to 25 parts by weight of an aromatic modified terpene resin excluding terpene phenol resins per 100 parts by weight of a diene rubber including from 30 to 80 weight % of a terminal-modified styrene-butadiene rubber and from 10 to 50 weight % of a butadiene rubber; wherein an average glass transition temperature of the diene rubber is −55° C. or lower and an average glass transition temperature of a compound formed from the diene rubber, the aromatic modified terpene resin, and an optional plasticizer is −45° C. or lower.

The aromatic modified terpene resin preferably has a hydroxy value of 30 KOH mg/g or less and a glass transition temperature of 55° C. or higher. Additionally, when compounding a terpene phenol resin having a hydroxy value of 30 KOH mg/g or less as the plasticizer, preferably a compounded amount of the terpene phenol resin (B) is adjusted so that, in relation to a compounded amount of the aromatic modified terpene resin (A), a weight ratio B/(A+B) is 0.9 or less.

A terminal functional group of the terminal-modified styrene-butadiene rubber is preferably at least one selected from a hydroxy group, an N-alkyl substituted amino ketone group, and an N-alkyl substituted amino thioketone group.

Additionally, the rubber composition for use in tires of the present technology can be advantageously used in a tread portion of pneumatic tires for use on icy and snowy roads (studless tires).

In the rubber composition for use in tires of the present technology, from 60 to 120 parts by weight of a silica having a CTAB specific surface area of from 70 to 175 m²/g and from 3 to 25 parts by weight of an aromatic modified terpene resin excluding terpene phenol resins are compounded per 100 parts by weight of a diene rubber including from 30 to 80 weight % of a terminal-modified styrene-butadiene rubber and from 10 to 50 weight % of a butadiene rubber. Therefore, wet grip performance can be enhanced because the terminal-modified styrene-butadiene rubber acts on the silica, thus improving the dispersibility thereof. An increase in rubber hardness at low temperatures can be suppressed due to adjusting the average glass transition temperature of the diene rubber to −55° C. or lower. As a result, adhesion force to icy and snowy road surfaces increases and ice and snow grip performance can be secured. Moreover, a tan δ at 0° C. increases and wet grip performance is secured due to adjusting the average glass transition temperature of the compound formed from the diene rubber, the aromatic modified terpene resin, and the optional plasticizer to −45° C. or lower. As a result, grip performance on both icy and snowy road surfaces and wet road surfaces can be enhanced to or above conventional levels.

DETAILED DESCRIPTION

In the rubber composition for use in tires of the present technology, the rubber component is a diene rubber. The diene rubber includes at least a terminal-modified styrene-butadiene rubber (hereinafter, "modified SBR") and a butadiene rubber. Dispersibility of the silica in the rubber composition improves and wet grip performance (tan δ at 0° C.) is enhanced due to the inclusion of the modified SBR. Additionally, the rubber hardness is maintained while pliable at low temperatures, thereby enhancing adhesion force to icy and snowy road surfaces due to the including of the butadiene rubber.

A compounded amount of the modified SBR is set to from 30 to 80 weight % in the diene rubber, and preferably from 35 to 75 weight %. If the compounded amount of the modified SBR is less than 30 weight %, it will not be possible to improve the dispersibility of the silica and enhance wet grip performance. Additionally, if the compounded amount of the modified SBR exceeds 80 weight %, the glass transition temperature of the diene rubber will rise and performance on ice and snow will be negatively affected. A terminal-modified SBR with a terminal functional group selected from a hydroxy group, an N-alkyl substituted amino ketone group, an N-alkyl substituted amino thioketone group, a carboxyl group, and an alkoxysilyl group and incorporated on an end of the styrene butadiene rubber molecule, is preferably used as the modified SBR. By incorporating a hydroxy group, an N-alkyl substituted amino ketone group, or an N-alkyl substituted amino thioketone group as the terminal functional group, the dispersibility of the silica can be further enhanced due to an increase in interaction between the terminal functional group and a silanol group on the silica surface.

An amount of styrene included in the modified SBR is preferably from 14 to 40 weight % and more preferably from 20 to 35 weight %; and an amount of vinyl included is preferably from 10 to 75 weight % and more preferably from 30 to 70 weight %. By keeping an amount of the styrene and an amount of the vinyl in the modified SBR within such ranges, a glass transition temperature of the modified SBR can be preferably adjusted to a range of from −20 to −70° C. and more preferably to from −20 to −65° C. Such a modified SBR may be manufactured according to conventional methods. Alternatively, the modified SBR may be selected as desired from commercially available products.

A compounded amount of the butadiene rubber is set to from 10 to 50 weight % in the diene rubber, and preferably from 15 to 45 weight %. If the compounded amount of the butadiene rubber is less than 10 weight %, it will not be possible to maintain rubber hardness while pliable at low temperatures. Additionally, if the compounded amount of the butadiene rubber exceeds 50 weight %, wet grip performance will decline. An amount of vinyl included in the butadiene rubber is preferably from 80 weight % or less, and more preferably from 1 to 75 weight %. By keeping an amount of the vinyl in the butadiene rubber within such a range, it is possible to obtain both wet grip performance and performance on ice and snow.

The rubber composition of the present technology may be compounded with a diene rubber other than modified SBR and butadiene rubber. Compounding another diene rubber will facilitate the adjusting an average glass transition temperature of the diene rubber and an average glass transition temperature of a compound formed from the diene rubber, an aromatic modified terpene resin, and an optional plasticizer to the preferable ranges described hereafter. A compounded amount of the other diene rubber in the diene rubber is preferably from 0 to 40 weight %, and more preferably from 5 to 35 weight %. Examples of the other diene rubber include natural rubbers, isoprene rubbers, unmodified styrene butadiene rubbers, butyl rubbers, and the like. Among these, natural rubbers and unmodified styrene butadiene rubbers are preferable. A single rubber may be used or multiple rubbers may be blended and used as the other diene rubber.

In the rubber composition of the present technology, the average glass transition temperature of the diene rubber (hereinafter, "average $Tg_1$") is −55° C. or lower, and preferably from −55 to −70° C. By adjusting the average $Tg_1$ to be −55° C. or lower, rubber hardness is maintained while pliable at low temperatures, thereby enhancing adhesion force to icy and snowy road surfaces and thus making possible the securing of ice and snow grip performance. Here, the "average $Tg_1$ of the diene rubber" refers to an average glass transition temperature that is calculated as the total of the products of the Tgs of the modified SBR, the butadiene rubber, and the other diene rubber that is an optional constituent that constitute the diene rubber and the compounded proportions of each of the rubber components. Specifically, in a diene rubber formed from n components (n being an integer of 2 or greater), when a Tg of the modified SBR is $T_1$ (° C.) and a compounded proportion thereof is $W_1$ (weight %), a Tg of the butadiene rubber is $T_2$ (° C.) and a compounded proportion thereof is $W_2$ (weight %), and a Tg of the other diene rubber that is an optional constituent is Ti (° C.) (i is an integer of 3 to n) and a compounded proportion thereof is Wi (weight %) (i is an integer of 3 to n), then the average $Tg_1$ of the diene rubber is calculated according to the following formula (1):

$$\text{Average } Tg_1(° C.) = \Sigma(Ti \times Wi)/\Sigma Wi \quad (1)$$

($\Sigma Wi = 100$ (weight %)).

The glass transition temperatures of each of the diene rubbers are measured by a thermograph via differential scanning calorimetry (DSC) under conditions of a temperature elevation speed of 10° C./minute and temperatures at midpoints of the transition regions are defined as the glass transition temperatures thereof. Note that if the diene rubbers are an oil extended product, the glass transition temperature is a glass transition temperature in which oil extension oil has been removed.

In the present technology, the average glass transition temperature of the constituent formed from the diene rubber, the aromatic modified terpene resin, and the optional plasticizer (hereinafter "average $Tg_2$") is −45° C. or lower and preferably from −45 to −60° C. By adjusting the average $Tg_2$ to be −45° C. or lower, it is possible to obtain both wet grip performance and performance on ice and snow. Here, the "average $Tg_2$" of the compound formed from the diene rubber, the aromatic modified terpene resin, and the optional plasticizer refers to an average glass transition temperature of the component formed from the diene rubber and the hereinafter described aromatic modified terpene resin excluding terpene phenol resins and the optional plasticizer. The average $Tg_2$ is calculated as the total of the products of the glass transition temperatures of each of the constituents and the compounded amounts thereof, according to the same calculation method as the average $Tg_1$ described above. Specifically, in the component formed from m constituents (m being an integer of 2 or greater) selected from the diene rubber, the aromatic modified terpene resin, and the optional constituent that is a plasticizer, when a Tg is Tj (° C.) (j is an integer from 1 to m) and a compounded proportion thereof is Wj (weight %) (Wj is a compounded amount per 100 parts by weight of the diene rubber; and j is an integer from 1 to m), then the average $Tg_2$ is calculated according to the following formula (2):

$$\text{Average } Tg_2(° C.) = \Sigma(Tj \times Wj)/\Sigma Wj \quad (2)$$

Note that as described above, the diene rubber is formed from the modified SBR, the butadiene rubber, and the other diene rubber that is an optional constituent and the average $Tg_1$ thereof is calculated according the formula (1), described above. Therefore, when J=1, formula (2) is an expression of the diene rubber, and W1=100 and T1=$Tg_1$. Additionally, the optional plasticizer is formed from oil extension oil included in each diene rubber, an oil component that is optionally compounded in the rubber composition, a resin component, and a terpene phenol resin. Note that glass transition temperatures of the aromatic modified terpene resin and the plasticizer are measured according to the same method used for measuring the glass transition temperature of the diene rubber described above.

In the rubber composition for use in tires of the present technology, grip performance on both icy and snowy road surfaces and wet road surfaces can be enhanced by compounding the aromatic modified terpene resin. Note that in the present specification, "aromatic modified terpene resin" refers to aromatic modified terpene resins excluding terpene phenol resins. Specifically, if only a terpene phenol resin is compounded without compounding an aromatic modified terpene resin, it will not be possible to maintain rubber hardness while pliable at low temperatures and therefore grip performance on icy and snowy road surfaces will be negatively affected. The aromatic modified terpene resin is obtained by polymerizing a terpene and an aromatic compound that does not include phenol. Examples of the terpene include α-pinene, β-pinene, dipentene, limonene, and the like.

Examples of the aromatic compound include styrene, α-methylstyrene, vinyl toluene, indene, and the like. Such aromatic modified terpene resins increase a tan δ at 0° C. of the rubber composition and enhance wet grip performance due to excellent compatibility with the diene rubber.

A hydroxy value of the aromatic modified terpene resin is preferably 30 KOH mg/g or less and more preferably from 0 to 25 KOH mg/g. The tan δ at 0° C. increases and wet grip performance is enhanced by adjusting the hydroxy value of the aromatic modified terpene resin to be 30 KOH mg/g or less. Note that the hydroxy value of the aromatic modified terpene resin is measured in accordance with Japanese Industrial Standard (JIS) K1557-1.

A glass transition temperature of the aromatic modified terpene resin is preferably 20° C. or higher, and more preferably from 20 to 80° C. The tan δ at 0° C. increases and wet grip performance is enhanced by adjusting the glass transition temperature of the aromatic modified terpene resin to be 20° C. or higher and therefore is preferable.

A compounded amount of the aromatic modified terpene resin is from 3 to 25 parts by weight and preferably from 5 to 20 parts by weight per 100 parts by weight of the diene rubber. If the compounded amount of the aromatic modified terpene resin is less than 3 parts by weight, it will not be possible to sufficiently enhance grip performance on wet road surfaces. Additionally, if the compounded amount of the aromatic modified terpene resin exceeds 25 parts by weight, grip performance on wet road surfaces will be enhanced, but performance on ice and snow will decrease and therefore is not preferable.

A terpene phenol resin can be compounded as a plasticizer in the rubber composition of the present technology. Grip performance on wet road surfaces will be enhanced by compounding the terpene phenol resin. The terpene phenol resin to be used has a hydroxy value of preferably 30 KOH mg/g or less and more preferably from 0 to 20 KOH mg/g. Grip performance on wet road surfaces and performance on ice and snow can be balanced to a higher degree by adjusting the hydroxy value of the terpene phenol resin to be 30 KOH mg/g or less.

When compounding a terpene phenol resin, a compounded amount of said terpene phenol resin (B) is adjusted so that, in relation to the compounded amount of the aromatic modified terpene resin (A), a weight ratio B/(A+B) is preferably 0.9 or less, and more preferably from 0.1 to 0.7. Grip performance on wet road surfaces and performance on ice and snow can be balanced to a higher degree by adjusting the weight ratio (B/A+B) to be 0.9 or less.

Wet grip performance (tan δ at 0° C.) of the rubber composition of the present technology can be enhanced by compounding a silica. The silica to be used has a Cetyltrimethylammonium Bromide (CTAB) specific surface area of from 70 to 175 $m^2/g$ and preferably from 80 to 170 $m^2/g$. If the CTAB specific surface area of the silica is less than 70 $m^2/g$, reinforcement action provided to the rubber composition will be insufficient. Additionally, if the CTAB specific surface area of the silica exceeds 175 $m^2/g$, performance on ice and snow will decline and therefore is not preferable. Note that in the present technology, the CTAB specific surface area of the silica is measured in accordance with JIS K6221. Types of silicas that can be used are silicas generally compounded in rubber compositions for use in tires and include, for example, wet method silicas, dry method silicas, surface treated silicas, and the like.

A compounded amount of the silica is from 60 to 120 parts by weight and preferably from 60 to 100 parts by weight per 100 parts by weight of the diene rubber. If the compounded amount of the silica is less than 60 parts by weight, it will not be possible to enhance the wet grip performance (the tan δ at 0° C.). Additionally, if the compounded amount of the silica exceeds 120 parts by weight, processability of the rubber will be significantly negatively affected.

In the rubber composition of the present technology, compounding a silane coupling agent along with the silica will lead to improved dispersibility of the silica in the diene rubber can and therefore is preferable. A compounded amount of the silane coupling agent is preferably from 3 to 15 weight % and more preferably from 4 to 10 weight % with respect to the compounded amount of the silica. If the compounded amount of the silane coupling agent is less than 3 weight %, it will not be possible to sufficiently improve the dispersibility of the silica. Additionally, if the compounded amount of the silane coupling agent exceeds 15 weight %, the silane coupling agents will aggregate and condense, and the desired effects will not be able to be obtained.

The type of silane coupling agent to be used is not particularly limited, but sulfur-containing silane coupling agents are preferable. Examples of the sulfur-containing silane coupling agent include bis-(3-triethoxysilylpropyl)tetrasulfide, bis-(3-triethoxysilylpropyl)disulfide, 3-trimethoxysilylpropyl benzothiazole tetrasulfide, γ-mercaptopropyl triethoxysilane, 3-octanoylthiopropyl triethoxysilane, and the like.

Strength of the rubber of the rubber composition of the present technology can be enhanced by compounding a carbon black. A compounded amount of the carbon black is preferably from 2 to 70 parts by weight and more preferably from 3 to 60 parts by weight per 100 parts by weight of the diene rubber. If the compounded amount of the carbon black is less than 2 parts by weight, it will not be possible to sufficiently enhance the rubber strength. Additionally, if the compounded amount of the carbon black exceeds 70 parts by weight, rolling resistance will be negatively affected.

Furthermore, other inorganic fillers besides silica and carbon black may be compounded. Examples of such other inorganic fillers include clay, mica, talc, calcium carbonate, aluminum hydroxide, aluminum oxide, and the like.

The rubber composition for use in tires can also contain various types of additives that are commonly used in rubber compositions for use in tires such as vulcanization or crosslinking agents, vulcanization accelerators, antiaging agents, plasticizers, and coupling agents. These additives may be blended according to any common method to form the rubber composition for use in tires and may be used in vulcanization or crosslinking. Compounded amounts of these additives may be any conventional standard amount, as long as the objects of the present technology are not hindered. Such a rubber composition can be produced by mixing the above-mentioned components using a regular rubber kneading machine such as a Banbury mixer, a kneader, a roll mill, or the like.

The rubber composition for use in tires of the present technology can be advantageously used in tread portions of studless tires. Additionally, these studless tires display grip performance on both icy and snowy road surfaces and wet road surfaces equal to or beyond conventional levels.

The present technology is further explained below by examples. However, the scope of the present technology is not limited to these examples.

EXAMPLES

The compounding agents listed in Table 3 (compounded amount (parts by weight) per 100 parts by weight of the diene rubber), with the exception of the sulfur and the vulcanization accelerators, were added as a common formulation to the formulations listed in Tables 1 and 2 and kneaded in a 1.8 L sealed mixer for 5 minutes. The mixtures were discharged when they reached 140° C., and cooled at room temperature to obtain master batches for 15 types of rubber compositions for use in tires (Working Examples 1 to 7 and Comparative Examples 1 to 8). The sulfur and the vulcanization accelerators were added to these master batches and kneaded in open rolls to prepare the rubber compositions for use in tires. Note that the average glass transition temperature of the diene rubber (average $Tg_1$) and the average glass transition temperature of the component formed from the diene rubber, the aromatic modified terpene resin, and the optional plasticizer (average $Tg_2$; referred to as "Average $Tg_2$ of compound having plasticizer, etc. added to the diene rubber" in Tables 1 and 2) of each of the rubber compositions for use in tires were calculated according to the method described above and recorded in Tables 1 and 2.

The obtained 15 types of rubber compositions for use in tires were vulcanized in a 15×15×0.2 cm mold at 160° C. for 15 minutes to produce vulcanized rubber sheets. Wet grip performance and ice and snow grip performance were evaluated according to the methods described below.

Wet Grip Performance

In accordance with JIS K6394 a viscoelastic spectrometer made by Toyo Seiki Seisaku-Sho, Ltd. was used to measure a tan δ at 0° C. (loss elastic modulus) of the obtained vulcanized rubber sheets under the conditions of an elongation deformation strain rate of 10%±2% and a frequency of 20 Hz. The obtained results are shown on the "Wet grip performance" rows of Tables 1 and 2 as index values with an index value of Comparative Example 1 being 100. A larger index value indicates a larger tan δ at 0° C. and superior wet grip performance.

Ice and Snow Grip Performance

In accordance with JIS K6253, a type A durometer was used to measure a rubber hardness of the obtained vulcanized rubber sheets at a temperature of −10° C. The obtained results are shown on the "Ice and snow grip performance" rows of Tables 1 and 2 as index values with an inverse of the index value of Comparative Example 1 being 100. A larger index value indicates a lower rubber hardness at −10° C. and superior ice and snow grip performance.

TABLE 1

|  |  | Working Example 1 | Working Example 2 | Working Example 3 | Working Example 4 |
|---|---|---|---|---|---|
| Modified SBR 1 | Parts by weight | 66 | 66 | 66 | 66 |
| Modified SBR 2 | Parts by weight |  |  |  |  |
| BR | Parts by weight | 45 | 45 | 45 | 45 |
| NR | Parts by weight |  |  |  |  |
| Silica 1 | Parts by weight | 80 | 80 | 80 |  |
| Silica 2 | Parts by weight |  |  |  | 80 |
| Oil | Parts by weight | 25 | 20 | 20 | 20 |
| Aromatic modified terpene resin 1 | Parts by weight | 5 | 10 | 5 | 10 |
| Aromatic modified terpene resin 2 | Parts by weight |  |  |  |  |
| Terpene phenol resin | Parts by weight |  |  | 5 |  |
| Average $Tg_1$ of the diene rubber | ° C. | −61 | −61 | −61 | −61 |
| Average $Tg_2$ of component having plasticizer, etc. added to the diene rubber | ° C. | −52 | −48 | −50 | −48 |
| Wet grip performance | Index | 102 | 106 | 105 | 104 |
| Ice and snow grip performance | Index | 103 | 102 | 102 | 103 |

|  |  | Working Example 5 | Working Example 6 | Working Example 7 |
|---|---|---|---|---|
| Modified SBR 1 | Parts by weight | 48 |  | 66 |
| Modified SBR 2 | Parts by weight |  | 55 |  |
| BR | Parts by weight | 30 | 45 | 45 |
| NR | Parts by weight | 30 |  |  |
| Silica 1 | Parts by weight | 80 | 80 | 80 |
| Silica 2 | Parts by weight |  |  |  |
| Oil | Parts by weight | 20 | 20 | 20 |
| Aromatic modified terpene resin 1 | Parts by weight | 10 | 10 |  |
| Aromatic modified terpene resin 2 | Parts by weight |  |  | 10 |

TABLE 1-continued

| | | | | |
|---|---|---|---|---|
| Terpene phenol resin | Parts by weight | | | |
| Average Tg$_1$ of the diene rubber | ° C. | −61 | −59 | −61 |
| Average Tg$_2$ of component having plasticizer, etc. added to the diene rubber | ° C. | −53 | −51 | −51 |
| Wet grip performance | Index | 102 | 103 | 105 |
| Ice and snow grip performance | Index | 100 | 101 | 102 |

TABLE 2

| | | Comparative Example 1 | Comparative Example 2 | Comparative Example 3 | Comparative Example 4 |
|---|---|---|---|---|---|
| Modified SBR 1 | Parts by weight | 66 | 66 | | 66 |
| SBR | Parts by weight | | | 55 | |
| BR | Parts by weight | 45 | 45 | 45 | 45 |
| NR | Parts by weight | | | | |
| Silica 1 | Parts by weight | 80 | | 80 | 80 |
| Silica 3 | Parts by weight | | 80 | | |
| Oil | Parts by weight | 30 | 20 | 20 | 20 |
| Aromatic modified terpene resin 1 | Parts by weight | | 10 | 10 | |
| Aromatic modified terpene resin 2 | Parts by weight | | | | |
| Terpene phenol resin | Parts by weight | | | | 10 |
| Average Tg$_1$ of the diene rubber | ° C. | −61 | −61 | −77 | −61 |
| Average Tg$_2$ of component having plasticizer, etc. added to the diene rubber | ° C. | −55 | −48 | −56 | −45 |
| Wet grip performance | Index | 100 | 96 | 94 | 107 |
| Ice and snow grip performance | Index | 100 | 98 | 107 | 95 |

| | | Comparative Example 5 | Comparative Example 6 | Comparative Example 7 | Comparative Example 8 |
|---|---|---|---|---|---|
| Modified SBR 1 | Parts by weight | 66 | 36 | 84 | 66 |
| SBR | Parts by weight | | | | |
| BR | Parts by weight | 45 | 50 | 30 | 45 |
| NR | Parts by weight | | 20 | | |
| Silica 1 | Parts by weight | 80 | 80 | 80 | 80 |
| Silica 3 | Parts by weight | | | | |
| Oil | Parts by weight | 15 | 35 | 27 | 20 |
| Aromatic modified terpene resin 1 | Parts by weight | 15 | 25 | | |
| Aromatic modified terpene resin 2 | Parts by weight | | | | 25 |
| Terpene phenol resin | Parts by weight | | | | |
| Average Tg$_1$ of the diene rubber | ° C. | −61 | −73 | −50 | −61 |
| Average Tg$_2$ of component having plasticizer, etc. added to the diene rubber | ° C. | −43 | −44 | −48 | −44 |
| Wet grip performance | Index | 108 | 95 | 110 | 105 |
| Ice and snow grip performance | Index | 97 | 93 | 96 | 98 |

The types of raw materials used in Tables 1 and 2 are shown below.

Modified SBR 1: Styrene butadiene rubber terminally modified with a hydroxy group; Nipol NS530, manufactured by Zeon Corporation; Oil extended product including 20 parts by weight of an oil extension oil per 100 parts by weight of a rubber component; Styrene content=30 weight %; Vinyl content=60 weight %; Glass transition temperature with oil extension oil removed=−25° C.; Glass transition temperature with oil extension oil=−31° C.

Modified SBR 2: SBR terminally modified with an N-methylpyrrolidone group; Nipol NS116, manufactured by Zeon Corporation; Styrene content=23 weight %; Vinyl content=70 weight %; Glass transition temperature with oil extension oil removed=−21° C.

SBR: Styrene butadiene rubber; Nipol 1502, manufactured by Zeon Corporation; Styrene content=25 weight %; Vinyl content=15 weight %; Glass transition temperature=−54° C.

BR: Butadiene rubber; Nipol BR1220, manufactured by Zeon Corporation; C is content=98 weight %; Vinyl content=2 weight %; Glass transition temperature=−54° C.

NR: Natural rubber; RSS #3; Glass transition temperature=−65° C.

Silica 1: Zeosil 1165 MP, manufactured by Rhodia; CTAB specific surface area=155 $m^2/g$ Silica 2: Zeosil 1115 MP, manufactured by Rhodia; CTAB specific surface area=115 $m^2/g$ Silica 3: Nipsil AQ, manufactured by Tosoh Silica Corporation; CTAB specific surface area=180 $m^2/g$ Oil: Aromatic oil; Extract #4S, manufactured by Showa Shell Sekiyu K.K.; Glass transition temperature=−36° C.

Aromatic modified terpene resin 1: Styrene modified terpene resin; YS Resin TO-125, manufactured by Yasuhara Chemical Co., Ltd.; Glass transition temperature=65° C.; Hydroxy value≈0 KOH mg/g (trace amount and therefore undetectable)

Aromatic modified terpene resin 2: Styrene modified terpene resin; YS Resin TO-085, manufactured by Yasuhara Chemical Co., Ltd.; Glass transition temperature=25° C.; Hydroxy value=3 KOH mg/g Terpene phenol resin: YS Polyster U115, manufactured by Yasuhara Chemical Co., Ltd.; Glass transition temperature=56° C.; Hydroxy value=6 KOH mg/g

TABLE 3

| Common Formulation | Product name | Compounded amount (parts by weight) |
| --- | --- | --- |
| Carbon black | Shoblack N330T, manufactured by Cabot Japan K.K. | 20 |
| Silane coupling agent | Si 69, manufactured by Evonik Degussa | 6.4 |
| Stearic acid | Beads Stearic Acid YR, manufactured by NOF Corp. | 2.0 |
| Zinc oxide | Zinc Oxide #3, manufactured by Seido Chemical Industry Co., Ltd. | 2.5 |
| Paraffin wax | SANNOC, manufactured by Ouchi Shinko Chemical Industrial | 1.0 |
| Antiaging agent | SANTOFLEX 6PPD, manufactured by FLEXSYS | 1.0 |
| Sulfur | "Golden Flower" Oil Treated Sulfur Powder, manufactured by Tsurumi Chemical | 1.4 |
| Vulcanization accelerator CZ-G | NOCCELER CZ-G, manufactured by Ouchi Shinko Chemical Industrial Co., Ltd. | 1.5 |
| Vulcanization accelerator D-G | Soxinol DG, manufactured by Sumitomo Chemical Co., Ltd. | 1.5 |

The rubber compositions for use in tires of the present technology shown in Table 1 (Working Examples 1 to 7) were confirmed to have both superior wet grip performance and ice and snow grip performance. Additionally, in Table 2, Comparative Example 2 has both inferior wet grip performance and ice and snow grip performance due to the compounding of the silica 3 that has a CTAB specific surface area of 180 $m^2/g$. Moreover, processability of the rubber was negatively affected. Comparative Example 3 has inferior wet grip performance due to the compounding of the unmodified SBR in place of the modified SBR. Comparative Example 4 has inferior ice and snow grip performance due to the compounding of the terpene phenol resin in place of the aromatic modified terpene resin. Comparative Example 5 has inferior ice and snow grip performance due to the average $Tg_2$ of the component having the aromatic modified terpene resin, the plasticizer, and the like added to the diene rubber being higher than −45° C. Comparative Example 6 has both inferior wet grip performance and ice and snow grip performance due to the modified SBR being compounded at a lower limit and the butadiene rubber being compounded at an upper limit and, also, due to the average $Tg_2$ being higher than −45° C. Comparative Example 7 has inferior ice and snow grip performance due to not compounding the aromatic modified terpene resin and due to the average $Tg_i$ of the diene rubber being higher than −55° C. Comparative Example 8 has inferior ice and snow grip performance due to the average $Tg_2$ being higher than −45° C.

What is claimed is:

1. A rubber composition for use in tires comprising:
from 60 to 120 parts by weight of a silica having a CTAB specific surface area of from 80 to 170 $m^2/g$ and from 3 to 20 parts by weight of an aromatic modified terpene resin excluding terpene phenol resins per 100 parts by weight of a diene rubber comprising from 30 to 80 weight % of a terminal-modified styrene-butadiene rubber and from 10 to 50 weight % of a butadiene rubber; wherein the total of the terminal-modified styrene-butadiene rubber and the butadiene rubber is from 60 to 100 weight % based on the amount of the diene rubber, the terminal functional group of the terminal-modified styrene-butadiene rubber is a hydroxy group or an N-methylpyrrolidone group, the average glass transition temperature of the diene rubber is −55° C. to −70° C., the average glass transition temperature of a compound formed from the diene rubber, the aromatic modified terpene resin, and an optional oil component-containing plasticizer is from −45° C. to −60° C., the hydroxy value of the aromatic modified terpene resin is from 0 to 25 KOH mg/g, and the glass transition temperature of the aromatic modified terpene resin is from 20 to 80° C.

2. The rubber composition for use in tires according to claim 1, further comprising a terpene phenol resin having a hydroxy value of from 0 to 20 KOH mg/g as the plasticizer, wherein the compounded amount (B) of said terpene phenol resin is adjusted so that, in relation to a compounded amount (A) of the aromatic modified terpene resin, the weight ratio B/(A+B) is 0.9 or less.

3. The rubber composition according to claim 2, wherein the weight ratio B/(A+B) is from 0.1 to 0.7.

4. The rubber composition for use in tires according to claim 1, comprising from 60 to 100 parts by weight of the silica.

5. The rubber composition for use in tires according to claim 1, further comprising a silane coupling agent in an amount of from 3 to 15 weight % with respect to the amount of the silica.

6. The rubber composition for use in tires according to claim 5, wherein the silane coupling agent is from 4 to 10 weight % with respect to the amount of the silica.

7. The rubber composition according to claim 1, wherein the diene rubber comprises an amount of styrene from 14 to 40 weight %.

8. The rubber composition according to claim 7, wherein the diene rubber comprises an amount of styrene from 20 to 35 weight %.

9. The rubber composition according to claim 1, wherein the diene rubber comprises an amount of vinyl from 10 to 75 weight %.

10. The rubber composition according to claim 9, wherein the diene rubber comprises an amount of vinyl from 30 to 70 weight %.

11. The rubber composition according to claim 1, wherein the average glass transition temperature is from −55 to −65° C.

12. The rubber composition according to claim 1, wherein the diene rubber comprises from 15 to 45 weight % of the butadiene rubber.

13. The rubber composition according to claim 1, comprising from 5 to 20 parts by weight of the aromatic modified terpene resin per 100 parts by weight of the diene rubber.

14. A rubber composition for use in tires comprising:
from 60 to 120 parts by weight of a silica having a CTAB specific surface area of from 80 to 170 $m^2/g$ and from 3 to 20 parts by weight of an aromatic modified terpene resin excluding terpene phenol resins per 100 parts by weight of a diene rubber comprising from 30 to 80 weight % of a terminal-modified styrene-butadiene rubber and from 10 to 50 weight % of a butadiene rubber;
wherein the total of the terminal-modified styrene-butadiene rubber and the butadiene rubber is from 60 to 100 weight % based on the amount of the diene rubber, the terminal functional group of the terminal-modified styrene-butadiene rubber is a hydroxy group or an N-methylpyrrolidone group, the average glass transition temperature of the diene rubber is −55° C. to −70° C., the average glass transition temperature of a compound formed from the diene rubber and the aromatic modified terpene resin is from −45° C. to −60° C., the hydroxy value of the aromatic modified terpene resin is from 0 to 25 KOH mg/g, and the glass transition temperature of the aromatic modified terpene resin is from 20 to 80° C.

15. A rubber composition for use in tires comprising:
from 60 to 120 parts by weight of a silica having CTAB specific surface area of from 80 to 170 $m^2/g$ and from 3 to 20 parts by weight of an aromatic modified terpene resin excluding terpene phenol resins per 100 parts by weight of a diene rubber comprising from 30 to 80 weight % of a terminal-modified styrene-butadiene rubber and from 10 to 50 weight % of a butadiene rubber; and
an oil component-containing plasticizer;
wherein the total of the terminal-modified styrene-butadiene rubber and the butadiene rubber is from 60 to 100 weight % based on the amount of the diene rubber, the terminal functional group of the terminal-modified styrene-butadiene rubber is a hydroxy group or an N-methylpyrrolidone group, the average glass transition temperature of the diene rubber is −55° C. to −70° C., the average glass transition temperature of a compound formed from the diene rubber, the aromatic modified terpene resin and the oil component-containing plasticizer is from −45° C. to −60° C., the hydroxy value of the aromatic modified terpene resin is from 0 to 25 KOH mg/g, and the glass transition temperature of the aromatic modified terpene resin is from 20 to 80° C.

16. A studless tire using the rubber composition for use in tires according to claim 1 in a tread portion.

* * * * *